United States Patent [19]
Dyer et al.

[11] Patent Number: 5,927,064
[45] Date of Patent: Jul. 27, 1999

[54] START, SHUTOFF AND OVERSPEED SYSTEM FOR GAS TURBINE ENGINE

[75] Inventors: Gerald P. Dyer, Enfield; Mark R. Tardif, Andover, both of Conn.

[73] Assignee: United Technologies Corporation, Windsor Locks, Conn.

[21] Appl. No.: 08/996,600

[22] Filed: Dec. 23, 1997

[51] Int. Cl.[6] .................................................. F02C 9/28
[52] U.S. Cl. ................................. 60/39.141; 60/39.281
[58] Field of Search ............................ 60/39.141, 39.281

[56] References Cited

U.S. PATENT DOCUMENTS

| | | | |
|---|---|---|---|
| 4,493,187 | 1/1985 | Hansen ................................. | 60/39.281 |
| 4,602,479 | 7/1986 | Hansen ................................. | 60/39.281 |
| 4,716,723 | 1/1988 | Ralston et al. ........................ | 60/39.281 |
| 4,760,662 | 8/1988 | Dyer et al. ............................ | 60/39.281 |

Primary Examiner—Louis J. Casaregola

[57] ABSTRACT

A start, shutoff and overspeed system includes a shutoff valve which permits the flow of fuel to an engine when the pressure of the main flow of fuel received from the fuel pump at first end of the shutoff valve exceeds a bias pressure at a second end of the shutoff valve. The bias pressure at the second end of the shutoff valve is controlled by an overspeed governor valve operating in conjunction with a start solenoid valve and shutoff solenoid valve. The overspeed governor positions a spool valve in response to engine speed. During engine start the spool valve sets the bias pressure to a first pressure which closes the shutoff valve, permitting fuel flow to the engine. As speed increases the spool must transition to a second position to maintain the shutoff valve in a closed position. If the spool fails to transition, the start solenoid will set the bias pressure such that the shutoff valve will prevent engine start. The overspeed governor will transition to a third position, for an overspeed condition, which controls the bias pressure such that the engine will operate at a reduced speed. The shutoff solenoid operates to shut the engine down regardless of overspeed governor or start solenoid position.

8 Claims, 9 Drawing Sheets

START, SHUTOFF AND OVERSPEED SYSTEM FOR GAS TURBINE ENGINE

TECHNICAL FIELD

This invention relates generally to fuel controls for gas turbine engines and more particularly to an improved method for control of engine overspeed.

BACKGROUND ART

To reduce the risk of failure from such condition as mechanical overloading and excessive operating temperatures, most gas turbine engines have limited upper operating speeds.

It is well known in the art of fuel delivery systems for aircraft gas turbine engines to use a fixed positive displacement pump, such as a vane or gear pump, to pressurize fuel for subsequent delivery to the engine. The output of the pump is at an elevated pressure or supply pressure and the inlet of the pump is at a low pressure know as drain pressure. The fixed positive displacement pump provides a flow whose volume is a function of the speed at which the pump is rotating.

The pump output is delivered to a metering valve which in conjunction with a pressure regulating valve, precisely meters the fuel for delivery to the engine. Excess fuel is bypassed from the input of the metering valve to the inlet of the pump or to a fuel reservoir.

Often, overspeed conditions, particularly in such engines employed in powering aircraft, result from the failure of the metering valve in the engine's fuel control, or an erroneous signal from an associated electronic controller which adjusts the metering valve to an excessive high flow setting.

Typical overspeed systems monitor the speed of the aircraft turbine and upon detection of an overspeed condition will either stop the flow of fuel to the engine thus shutting it down, or reduce the flow of fuel to the engine, thus operating the engine at a reduced speed.

The typical overspeed governor consists of a spool valve, which controls various pressure signals, the position of which is determined by turbine speed. At system start, the spool of the overspeed governor will be at an initial position and will translate as turbine speed increases. When an overspeed condition is sensed, the overspeed governor will cause a shutdown of the engine or reduce fuel flow to cause the engine to operate at a reduced speed.

As part of preflight check-out of an aircraft, the overspeed system is tested to ensure proper function. If the overspeed system fails, the aircraft is prevented from taking off until the failure is diagnosed. The check out of the overspeed system is performed using a pressure switch for monitoring the various pressure signals controlled by the overspeed governor or by a microswitch for monitoring the position of the spool. These switches are typically monitored by the electronic engine control (EEC). If the EEC fails to detect switch closure at a given turbine speed, the EEC shuts the engine down.

The switches used for check out of the overspeed governor typically have a higher failure rate than the overspeed governor. This leads to situations where the switch indicates an overspeed system failure, when in fact only the switch has failed. However, due to safety concerns the aircraft must remain grounded until the failure has been diagnosed and corrected.

Therefore, there exists a need for an overspeed system with increased reliability and built in test capability.

DISCLOSURE OF INVENTION

An object of the present invention is to increase the reliability of the start, shut-off and overspeed system.

Another object of the present invention is to eliminate the need for monitoring by the electronic engine control (EEC) to determine failure of the overspeed system.

According to the present invention a start, shutoff and overspeed system comprises a start solenoid, a shutoff solenoid, a shutoff valve and an overspeed governor.

The shutoff valve is in fluid communication with the pump for receiving the pump output flow and in fluid communication with the metering valve for providing fuel to the engine. The shutoff valve is responsive to a bias pressure for controlling the flow of fuel to the metering valve.

The shutoff valve permits the flow of fuel to the metering valve, which In turn regulates the flow of fuel to the turbine engine, when the pump output flow has a fuel pressure less than or equal to the bias pressure. The shutoff valve reduces the flow of fuel to the metering valve when pump output pressure is greater than the bias pressure. The amount of fuel delivered to the metering valve is a function of the amount of overspeed. The bias pressure to the shutoff valve is decreased as the amount of overspeed increases, which causes the a greater quantity of fuel to bypassed away from the metering valve.

The overspeed governor is essentially a three position spool valve that is responsive to the turbine speed for setting the bias pressure to the shutoff valve. At system start the overspeed governor sets the bias pressure to a first pressure as determined by the start solenoid.

As the turbine speed increases the overspeed governor translates to a second position, setting the bias pressure to a second pressure essentially equal to the pump output pressure. When the bias pressure is greater than or equal to the pump output pressure the shutoff valve remains closed and fuel flows to the metering valve allowing the engine to operate.

If turbine speed increases such that an overspeed condition exists, the spool translates to a third position, setting bias pressure to a third pressure, lower than the pump output pressure. This allows the shutoff valve to open thus bypassing fuel away from the metering valve, resulting in lower engine speed.

The start solenoid valve controls the pressure for setting the first pressure which is input to the overspeed governor. At system start the start solenoid sets the first pressure to the second pressure which is essentially equal to the pump output pressure which as stated above allows the engine to operate normally.

As turbine speed increases and the overspeed governor translates to its second position, the start solenoid sets the first pressure to the third pressure which is lower than the pump output pressure. If the overspeed governor is operating properly and is in its second position then the effect of the start solenoid switching to the third pressure is not seen by the shutoff valve. If however, the overspeed governor fails and does not translate to the second position, then the bias pressure of the shutoff valve is set to the third pressure through the start solenoid and the engine operates at a reduced speed.

BEST MODE FOR CARRYING OUT THE INVENTION

Figure 1:
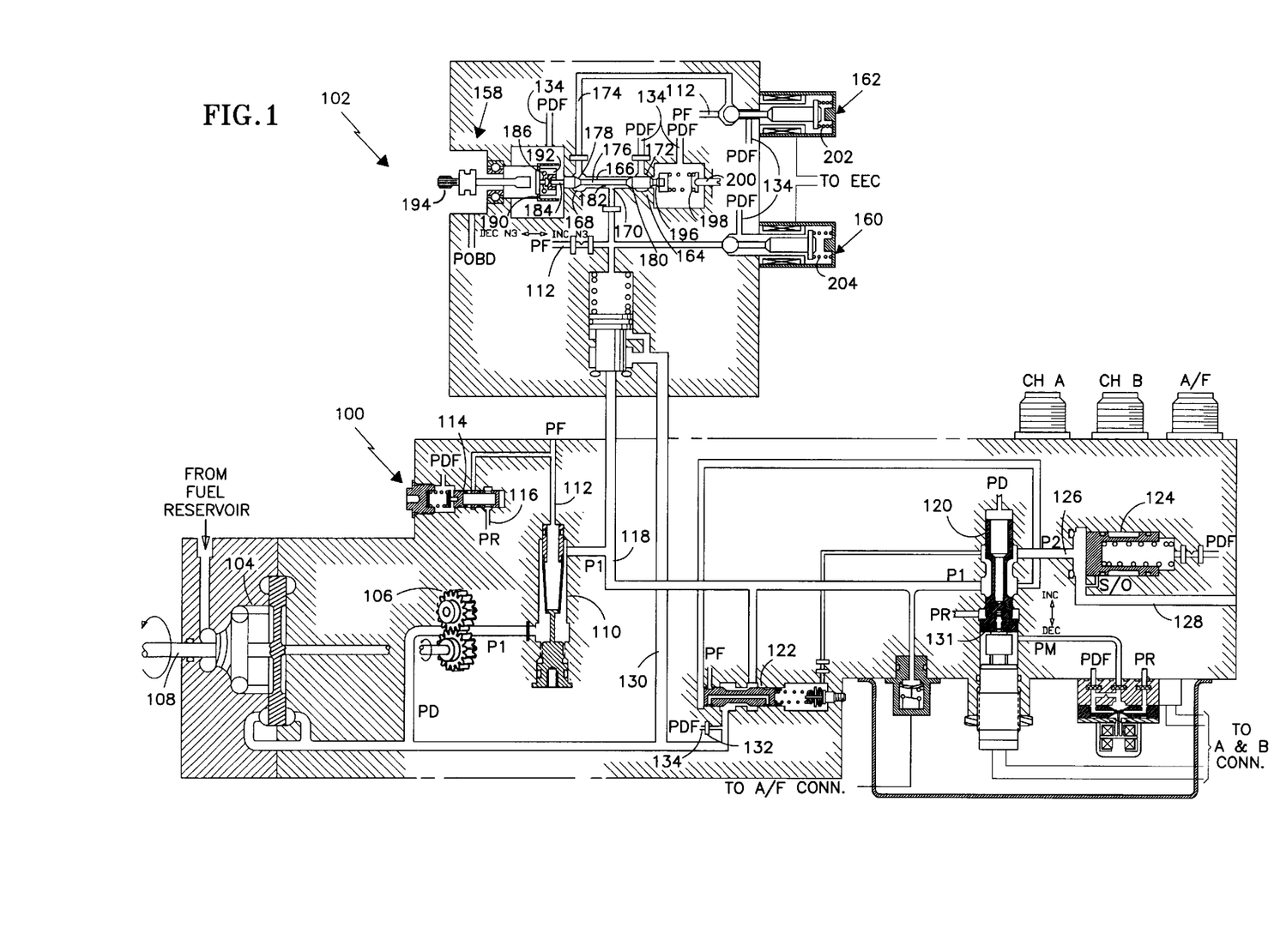
FIG. 1 is a schematic view of a start, shutoff, overspeed governor system according to the present invention in the start position.

Referring to FIG. 1, there is illustrated a fuel control 100 incorporating a start, shutoff and overspeed system 102 for a turbine engine (not shown), according to the present invention. Upon start up fuel is supplied to an inducer/boost pump 104 which in turn supplies fuel to the inlet of the positive displacement pump 106.

The positive displacement pump 106, is driven by a shaft 108 which in turn is driven by the engine (not shown). Therefore the amount of fuel delivered by positive displacement pump 106 is a function of engine speed.

The output of the positive displacement pump 106 is input to a fine screen filter 110 which filters out impurities from the fuel. The filtered fuel (PF) on line 112 has a pressure slightly lower than the pump output (P1). The difference in pressure being equal to the pressure drop across the fine screen filter 110. A portion of the filtered fuel (PF) is delivered through line 112 to a servo pressure regulator 114. The servo pressure regulator 114 produces regulated pressure (PR) on line 116. PR is lower than PF and is used as a control pressure as will be described herein.

The majority of the fuel output from the positive displacement pump 106 is delivered via main fuel line 118 to a metering valve 120 and pressure regulating valve 122. The metering valve 120 controls the flow of fuel to the engine. The output of the metering valve 120 is delivered to the pressurizing valve 124 on line 126. The pressurizing valve 124 maintains the pressure of the regulated fuel, to be delivered to the engine (not shown) through line 128, to a desired minimum.

The pressure regulating valve 122 regulates the pressure drop across the metering valve 120 so that the metering valve 120 can precisely control the flow of fuel to the engine. The pressure regulating valve 122 monitors the pressure differential across metering valve 120 which is equal to the difference between pressure P1 on main fuel line 118 and pressure P2 at the output of the metering valve on line 126 and bypasses an amount of flow on bypass line 130 to maintain the pressure differential across metering valve 120 to a desired set point. The pressure of fuel in bypass line 130 is at pump 106 inlet pressure, also known as drain pressure, (PD).

The fuel in main fuel line 118 is also ported to an overspeed shutoff and spill valve 136 (FIG. 2) which includes a chamber 138 having a reciprocally movable valve element 140 therein. Valve element 140 is biased downwardly by spring 142 and a bias or threshold pressure acting on a first end 144 of the valve element 140. The bias pressure in bias pressure line 146 is placed in fluid communication with chamber 138 through third port 148. The fuel in main fuel line 118 acts on a second end 150 of valve element 140 which is half the area of the first end 144. The chamber has a first port 152 and second port 154 located along its length. The first port 152 fluidly connects the chamber 138 and bypass line 130. Second port 154 fluidly connects the bypass line 130 with a stepped portion 156 of second end 150. The function of stepped portion 156 is described herein.

The bias pressure on line 146 is determined by the interaction of the overspeed governor 158, the shutoff solenoid valve 160 and the start solenoid valve 162 which together with the overspeed shutoff and spill valve 136 form the start, shutoff and overspeed system 102.

The overspeed governor 158 is a fly weight actuated spool valve, consisting of a housing 164 with a cavity 166 disposed therein. Located along the length of housing 164 are first port 168, second port 170 and third port 172. First port 168 provides fluid communication between cavity 166 and start solenoid line 174. Second port 170 provides fluid communication between cavity 166 and bias pressure line 146. Third port 172 provides fluid communication between cavity 166 and filtered drain pressure (PDF) via line 134 which is approximately equal to PD.

Also disposed within cavity 166 is spool 176. Spool 176 has, disposed along its length a first land 178 and a second land 180 with a recess 182 disposed therebetween. Located at a first end 184 of spool 176 is a flyball governor 186. The flyball governor 186 consists of a rotatable member 190 which houses a pair of pivotably mounted weights 192 therein. The rotatable member 190 is connected to a shaft 194, for rotation therewith, which in turn is driven by the engine (not shown).

Located at a second end 196 of the spool 176 is a spring 198 for biasing the spool 176 toward the pivotably mounted weights 192. An adjustment screw 200 allows for manual adjustment of the bias for the spool 176. Lines 134 on either end of the housing 164 return any fluid that leaks past first land 178 and second land 180 back to the inlet of pump 106.

Start solenoid valve 162 is a two position valve which is actuated by the EEC. In a first energized position (shown in FIG. 1) the start solenoid valve 162 places the start solenoid line 174 in fluid communication with PF from line 112. In a second, normally closed position (shown in FIG. 2) the start solenoid valve 162 places the start solenoid line 174 in fluid communication with PDF on line 134. The start solenoid valve 162 is held in the normally closed position by spring 202.

The shutoff solenoid valve 160 is also a two position solenoid valve actuated by the EEC. In a first energized position (not shown) the shutoff solenoid valve 160 fluidly connects the bias pressure line 146 to PDF and in the normally closed, de-energized position, as shown, isolates the bias pressure line 146 from PDF. The shutoff solenoid valve 160 is held in the normally closed position by spring 204.

Operation of the start shutoff and overspeed system 102 is as flows. During a normal system start, a starter (not shown)

provides a motive force to rotate the turbine engine which rotates pump shaft 108 of positive displacement pump 106 which causes fuel to flow though the main fuel line 118 at a pressure P1. Fuel also flows through the fine screen filter 110 to produce a flow of filtered fuel PF on line 112 which is fluid communication with the first end 144 of overspeed, shutoff and spill valve 136, the shutoff solenoid valve 160, the second port 170 of the overspeed governor 158, the start solenoid 162 and the bias pressure line 146.

The shaft 194 of the overspeed governor 158 is rotated in response to the turbine engine being rotated. The rotating of shaft 194 imparts a rotary motion to rotatable member 190, which causes pivotably mounted weights 192 to pivot imparting a force to the first end 184 of spool 176. The force exerted by the pivotably mounted weights 192 is opposed by spring 198. The force of spring 198 is sufficient to hold the spool 176 in the start position as shown in FIG. 1 for turbine speeds less than a first turbine speed.

With the spool 176 in a first position, recess 182 connects first port 168 with second port 170, thus placing bias pressure line 146 in fluid communication with start solenoid line 174 and PF on line 112. Second land 180 is positioned such that bias pressure line 146 is isolated from PDF line 134.

During engine start the start solenoid valve 162 is energized such that the start solenoid line 174 is in fluid communication with PF on line 112 and isolated from PDF on line 134. The shutoff solenoid valve 160 is de-energized such that bias pressure line 146 is isolated from PDF on line 134.

Therefore, pressure PF is present at first end 144 of the overspeed, shutoff and spill valve 136. As discussed previously, PF is at a slightly lower pressure than P1 which is present at the second end 150 of the overspeed, shutoff and spill valve 136 however, first end 144 is twice the area of second end 150 and therefore second end 150 remains seated against housing 206 allowing fuel to flow to the metering valve 120 which in turn regulates the flow of fuel to the engine.

Figure 2:
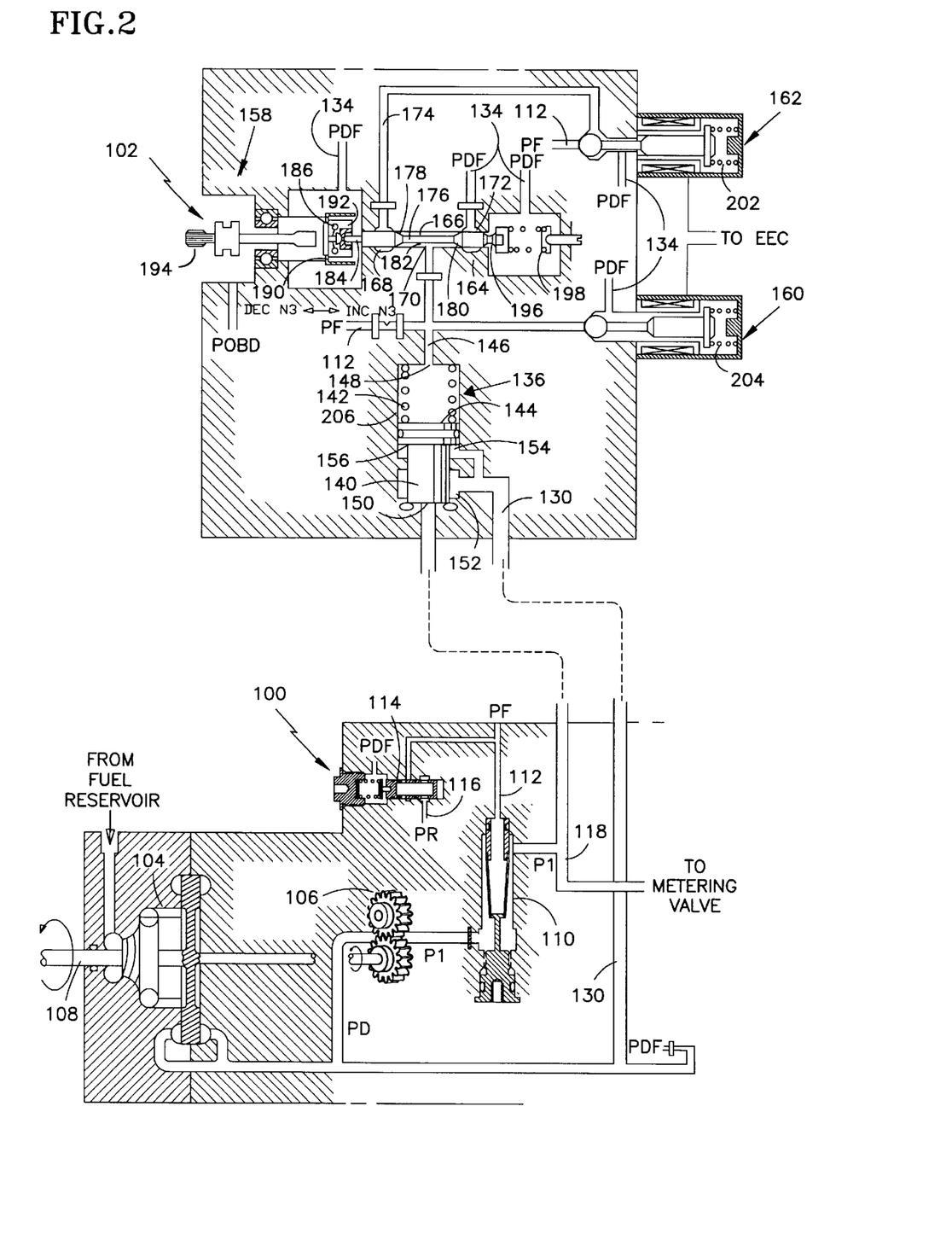
FIG. 2 is a schematic view of a start, shutoff, overspeed governor system according to the present invention in the run position.

As the turbine speed increases to a second turbine speed the speed of rotation of shaft 108 of the positive displacement pump 106 increases causing an increase in fuel flow. The speed of shaft 194 of the overspeed governor 158 also increases thus increasing the force exerted by the pivotably mounted weights 192 on the first end 184 of spool 176 causing the spool 176 to transition to a run position as shown in FIG. 2.

In the run position the spool 176 is positioned such that the first land 178 isolates first port 168 from second port 170 thus isolating bias pressure line 146 from start solenoid line 174 and second land 180 isolates third port 172 from second port 170, thus isolating the bias pressure line 146 from PDF on line 134.

The shutoff solenoid valve 160 remains in the de-energized, normally closed position, isolating the bias pressure line 146 from PDF on line 134. The start solenoid valve 162 is de-energized shortly after the spool 176 transitions to the run position placing the start solenoid line 174 in fluid communication with PDF on line 134, however as discussed above, the start solenoid line 174 is isolated from the bias pressure line 146.

Therefore, the bias pressure acting upon first end 144 remains at PF and therefore second end 150 remains seated against housing 206 allowing fuel to flow to the metering valve 120.

Figure 3:
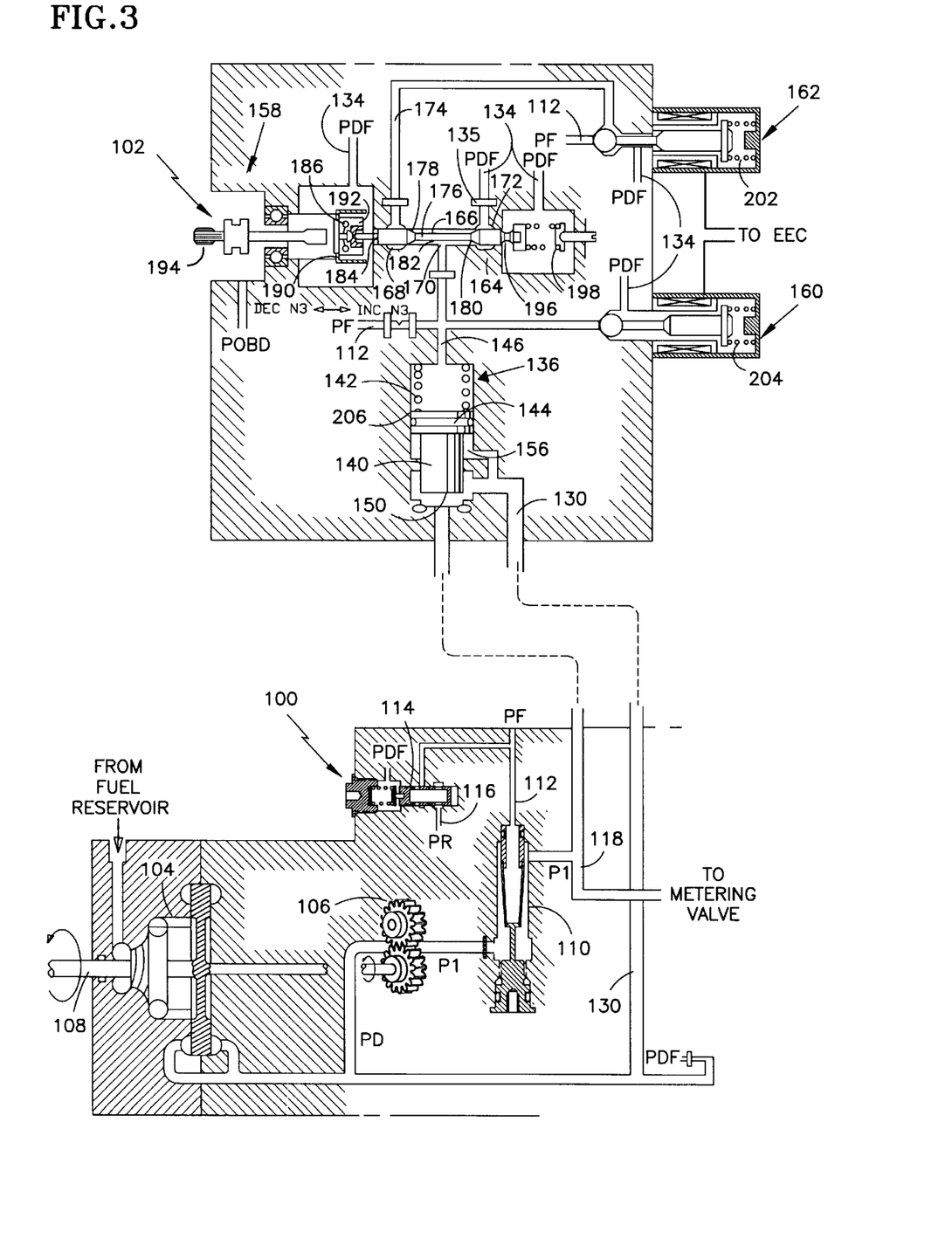
FIG. 3 is a schematic view of a start, shutoff, overspeed governor system according to the present invention in the overspeed position.

FIG. 3 illustrates the start, shutoff and overspeed system 102 in an overspeed condition. As the speed of the turbine exceeds a third turbine speed, the force exerted by the pivbtably mounted weights 192 will exert a force on the first end 184 of spool 176 to cause the spool to translate to a third position wherein first land 178 isolates first port 168 from second port 170 and second land 180 allows fluid communication between third port 172 and second port 170, thus placing bias pressure line 146 in fluid communication with PDF on line 134 porting PF on line 112 to PDF on line 134, through orifice 135.

Pressure PDF and the force of spring 142 are therefore acting upon first end 144 of valve element 140. A discussed previously, PDF is approximately equal to the inlet pressure at the positive displacement pump 106 which is less than P1. Therefore valve element 140 unseats from housing 206 and places main fuel line 118 in fluid communication with bypass line 130, thus bypassing fuel away from the metering valve 120.

The bypassing of fuel away from the metering valve 120 reduces the speed of the engine. The reduction in engine speed results in reduction of the overspeed governor 158 shaft 194 speed which reduces the force exerted by the pivotably mounted weights 192 on spool 176. The force of the spring 198 forces the spool to translate to the left to a control position where second land 180 closes a portion of third port 172 and thereby raises the pressure in bias pressure line 146. At this point the pressure in bias pressure line 146 will cause the spill valve 136 to start to close due to the increased pressure on first end 144 and spring force of spring 142. The amount of bypass flow to bypass line 130 is reduced causing the engine to re-accelerate until a state of equilibrium is reached at overspeed governor 158 trip point. The start shutoff and overspeed system 102 will always maintain the engine speed at the trip point regardless of the flight condition/loading until fuel is shut off or the shutoff solenoid 160 is energized. It should be noted that in this embodiment the trip speed (third turbine speed) for signaling an overspeed condition and control speed are the same.

Figure 4:
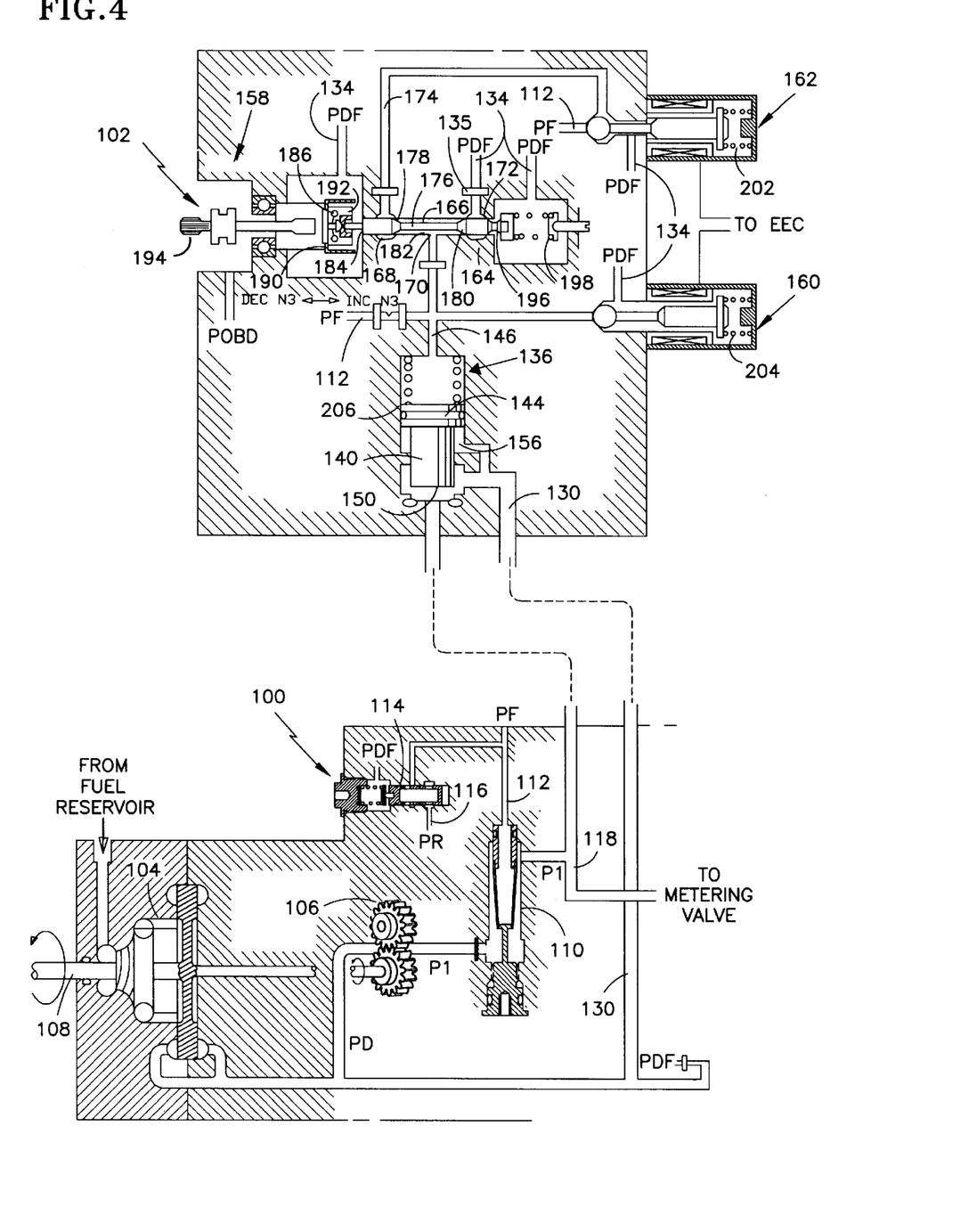
FIG. 4 is a schematic view of a start, shutoff, overspeed governor system according to the present invention in failure mode.

FIG. 4 illustrates the start, shutoff and overspeed system 102 in a startup failure condition with the built in test capability preventing engine start when the overspeed governor 158 fails to operate correctly. Operation of the start, shutoff overspeed system 102 is the same as in normal operation as described above. Recess 182 connects first port 168 with second port 170, thus placing bias pressure line 146 in fluid communication with communication start solenoid line 174. Second land 180 is positioned such that bias pressure line 146 is isolated from PDF line 134. The start solenoid 162 is energized by the EEC such that start solenoid line 174 is in fluid communication with PF on line 112 and isolated from PDF line 134.

However, in this failure mode, as the speed of shaft 194 increases, the spool 176 fails to transition, due to a malfunction, to the run position illustrated in FIG. 2 and remains in the start position as shown in FIG. 4. Therefore when the start solenoid 162 is de-energized by the EEC, placing start solenoid line 174 in fluid communication with PDF line 134, the bias pressure line 146 is fluidly connected to PDF via the overspeed governor 158. PDF is acting of the first end 144 of valve element 140 and P1 is acting on second end 150 of valve element 140 thus unseating valve element 140 from housing 206 allowing fuel to bypass the fuel metering valve 120, thus preventing the engine from running.

Normal shutdown of the engine is effected by energizing shutdown solenoid valve 160. By energizing shutoff solenoid valve 160, the bias pressure line 146 is placed in fluid communication with PDF on line 134. But as opposed to an overspeed condition or overspeed governor 158 failure, the bias pressure is not regulated. The bias pressure is set to PDF. This causes the valve element 140 to unseat allowing fuel to bypass the fuel metering valve 120 causing the engine to shutdown.

Figure 5:
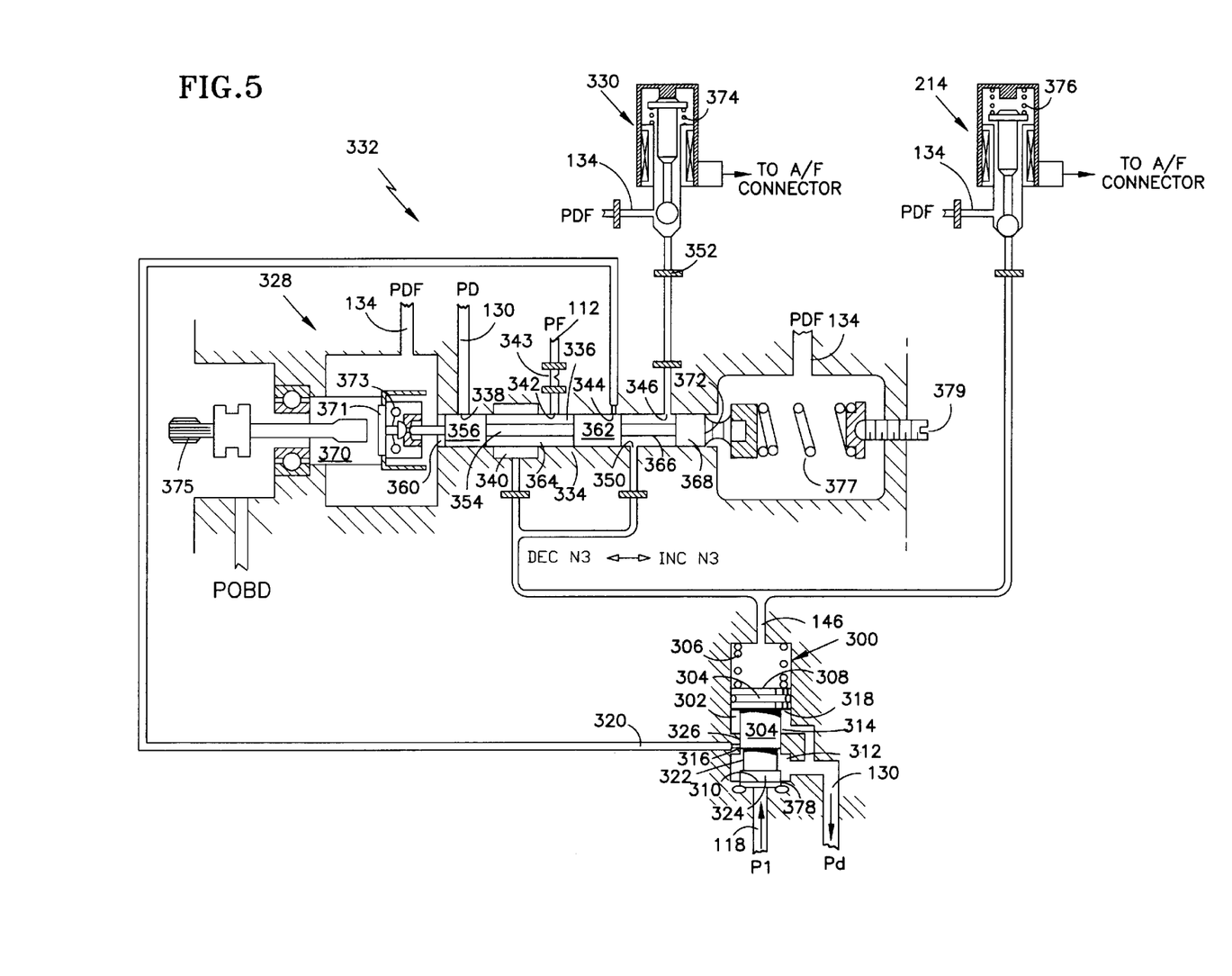
FIG. 5 is a schematic view of a start, shutoff, overspeed governor system according to a second embodiment of the present invention in the start position.

A second embodiment of the present invention is illustrated in FIG. 5. The fuel in main fuel line 118 is ported to an overspeed shutoff and spill valve 300 which includes a chamber 302 having a reciprocally movable valve element 304 therein. Valve element 304 is biased downwardly by spring 306 and a bias or threshold pressure acting on a first end 308 of the valve element 304. The fuel in main fuel line 118 acts on a second end 310 of valve element 304 which is half the area of the first end 308. The chamber has a first port 312, second port 314 and third port 316 located along its length. The first port 312 fluidly connects the chamber 302 and bypass line 130. Second port 314 fluidly connects the bypass line 130 with a stepped portion 318 of second end 310 and third port 316 fluidly connects the control speed line 320 to recess a 322 disposed between a first land 324 and second land 326

The bias pressure on bias pressure line 146 is determined by the interaction of the overspeed governor 328, the shutoff solenoid valve 214 and the start solenoid valve 330 which together with the overspeed shutoff and spill valve 300 form the a start, shutoff and overspeed system 332.

The overspeed governor 328 is a spool valve, consisting of a housing 334 with a cavity 336 disposed therein. Located along the length of housing 334 are first port 338, second port 340, third port 342, fourth port 344, fifth port 346 and sixth port 350. First port 338 provides fluid communication between cavity 336 and drain pressure PD via line 130. Second port 340 provides fluid communication between cavity 336 and bias pressure line 146. Third port 342 provides fluid communication between cavity 336 and filtered pressure (PF) via line 112. Fourth port 344 provides fluid communication between cavity 336 and control speed line 320. Fifth port 346 provides fluid communication between cavity 336 and start solenoid valve 330 via start solenoid line 352, sixth port 348 provides fluid communication between cavity 336 and bias pressure line 146.

Also disposed with in cavity 336 is spool 354. Spool 354 has, disposed along its length a first land 356 with a first recess 358 (FIG. 6) disposed between the first land 356 and first end 360. Next, is located a second land 362 with a second recess 364 disposed between second land 362 and first land 356. A third recess 366 separates the second land 362 from third land 368. Located at a first end 360 of spool 354 is a flyball governor 370. The flyball governor 370 consists of a rotatable member 371 which houses a pair of pivotably mounted weights 373 therein. The rotatable member 370 is connected to a shaft 375, for rotation therewith, which in turn is driven by the engine (not shown).

Located at a second end 372 of the spool 354 is a spring 377 for biasing the spool 354 toward the pivotably mounted weights 373. An adjustment screw 379 allows for manual adjustment of the bias for the spool 354. The second end 372 of the spool 354 is also connected to PDF via line 134 for returning any fluid that leaks past third land 368 back to the inlet of pump 106 (FIG. 1).

Start solenoid valve 330 is a normally open, two position valve which is actuated by the EEC. In a first energized position, as shown in FIG. 5, the start solenoid valve 330 fluidly disconnects the start solenoid line 352 from PDF on line 134. In a second, normally opened position the start solenoid valve 330 fluidly connects the start solenoid line 352 to PDF on line 134. The start solenoid valve 330 is held in the normally open position by spring 374.

The shutoff solenoid valve 214 is also a two position solenoid valve actuated by the EEC. In a first energized position (not shown in FIG. 5) the shutoff solenoid valve 214 fluidly connects the bias pressure line 146 to PDF on line 134 and in the normally closed, de-energized position (as shown in FIG. 5), isolates the bias pressure line 146 from PDF on line 134. The shutoff solenoid valve 214 is held in the normally closed position by spring 376.

Referring to FIG. 5 the operation of the second embodiment of the start, shutoff and overspeed system 332 is as follows: During a normal system start, a starter (not shown) provides a motive force to rotate the turbine engine which rotates pump shaft 108 (FIG. 1) of positive displacement pump 106 (FIG. 1) which causes fuel to flow though the main fuel line 118 at a pressure P1. Fuel also flows through the fine screen filter 110 (FIG. 1) to produce a flow of filtered fuel PF on line 112 which is in fluid communication with third port 342 of the overspeed governor 328 through orifice 343.

The shaft 375 of the overspeed governor 328 is rotated in response to the turbine engine being rotated. The rotating of shaft 375 imparts a rotary motion to rotatable member 371, which causes pivotably mounted weights 373 to pivot imparting a force to the first end 360 of spool 354. The force exerted by the pivotably mounted weights 373 is opposed by spring 377. The force of spring 377 is sufficient to hold the spool 354 in the start position as shown in FIG. 5 for turbine speeds less than a first turbine speed.

With the spool 354 in a first position first land 356 isolates PD on line 130 from bias pressure line 146. Second recess 364 places PF line 112 in fluid communication with bias pressure line 146 while third recess 366 places bias pressure line 146 in fluid communication with the start solenoid line 352. Second land 362 isolates control speed line 320 from bias pressure line 146 and third land 368 isolates bias pressure line 146 from PD on line 130. Therefore the pressure in bias pressure line 146 is determined by the start solenoid line valve 330 and PF line 112.

During engine start the start solenoid valve 330 is energized by the EEC such that the start solenoid line 352 is isolated from PDF on line 134. The shutoff solenoid valve 160 is de-energized such that bias pressure line 146 is isolated from PDF on line 134.

Therefore, pressure PF is present at first end 308 of the overspeed, shutoff and spill valve 300.

As discussed previously PF is slightly lower than P1 which is present at the second end 310 of the overspeed, shutoff and spill valve 300 however, PF acts upon twice the area of valve element 304 and therefore second end 310 remains seated against housing 378 allowing fuel to flow to the metering valve 120 which in turn regulates the flow of fuel to the engine.

Figure 6:
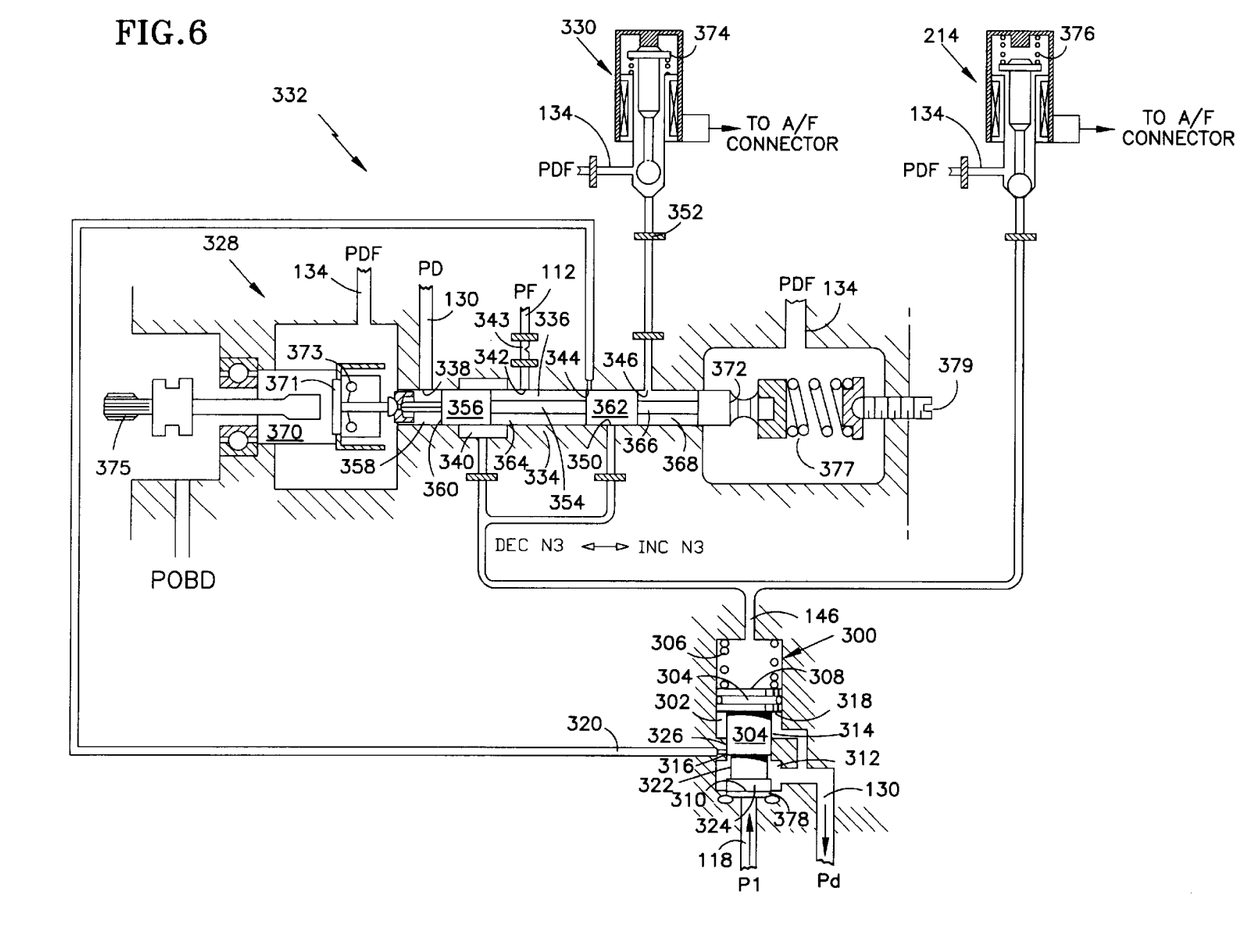
FIG. 6 is a schematic view of a start, shutoff, overspeed governor system according to a second embodiment of the present invention in the run position.

As the turbine speed increases to a second turbine speed the speed of rotation of shaft 108 (FIG. 1) of the positive displacement pump 106 (FIG. 1) increases causing an increase in fuel flow which in turn increases engine speed and rotational speed of the pivotably mounted weights 373 causes the spool 354 to transition to a run position as shown in FIG. 6.

In the run position the spool 354 is positioned such that the first land 356 isolates line PD in line 130 from bias pressure line 146. Second recess 364 places PF on line 112 in fluid communication with bias pressure line 146. Second land 362 isolates bias pressure line 146 from control speed line 320 and the start solenoid line 352.

The shutoff solenoid valve 160 remains in the de-energized, normally closed position, isolating the bias pressure line 146 from PDF on line 134. Start solenoid valve 330 is de-energized shortly after the spool 354 transitions to the run position, placing the start solenoid line 352 in fluid communication with PDF on line 134, however as discussed above, the start solenoid line 352 is isolated from the bias pressure line 146 by second land 362.

Therefore, the bias pressure acting upon first end 308 remains at PF and second end 310 remains seated against housing 378 allowing fuel to flow to the metering valve 120.

Figure 7:
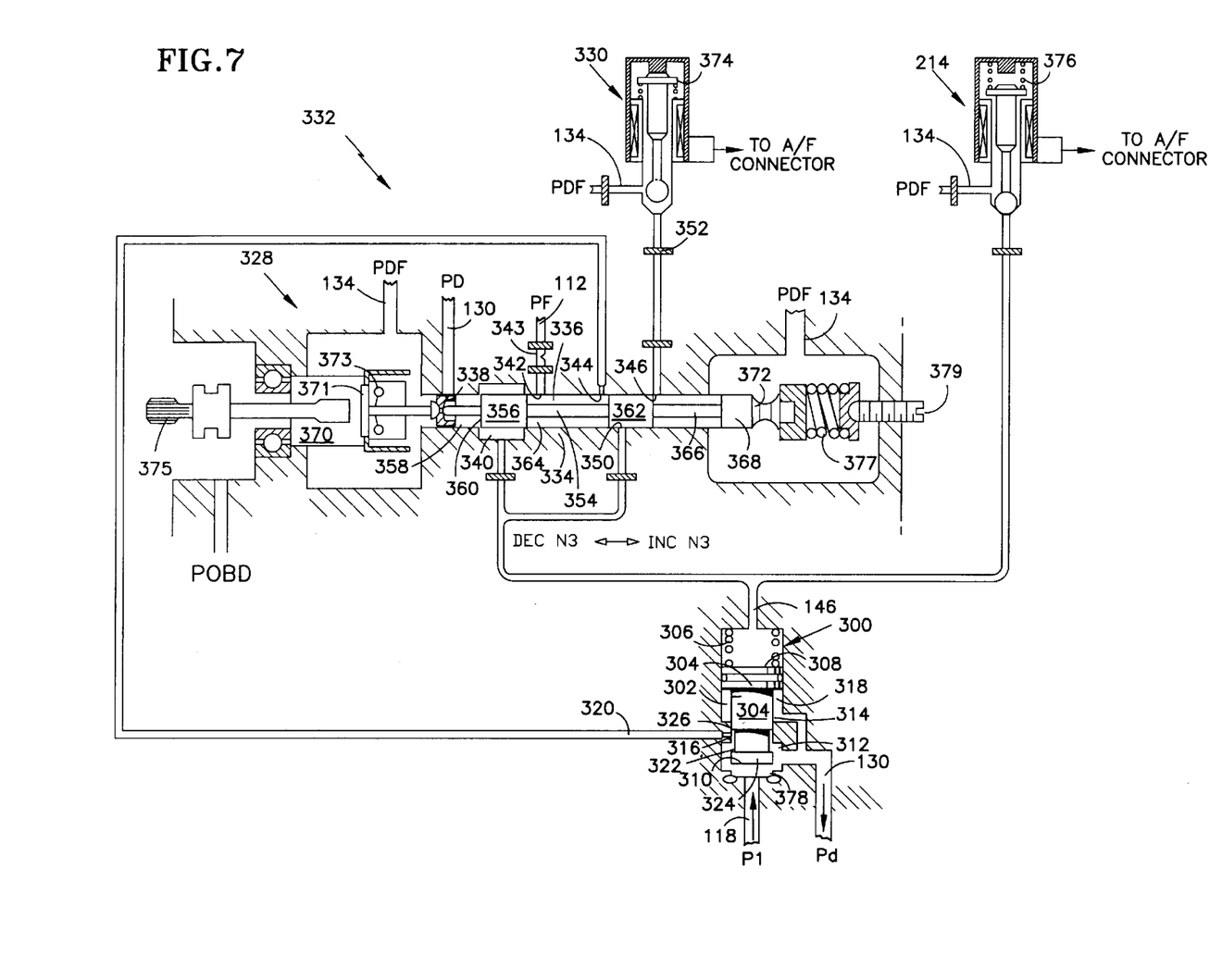
FIG. 7 is a schematic view of a start, shutoff, overspeed governor system according to a second embodiment of the present invention in the overspeed position.

FIG. 7 illustrates the start, shutoff and overspeed system 332 in an overspeed condition. As the speed of the turbine exceeds a third turbine speed pivotably mounted weights 373 causes the spool 354 to translate to a third position wherein first recess 358 places PD on line 130 in fluid communication with bias pressure line 146. First land 356 and second land 362 isolate PF on line 112 from bias pressure line 146. Second recess 364 places PF on line 112 in fluid communication with control speed line 320. Second land 362 isolates the start solenoid line 352 from bias pressure line 146. Therefore PD is present at first end 308 of valve element 304.

Pressure PD and the force of spring 306 are therefore acting upon first end 308. A discussed previously, PD is approximately equal to the inlet pressure at the positive displacement pump 106 which is less than P1. Therefore valve element 304 unseats from housing 378 placing main fuel line 118 in fluid communication with bypass line 130, thus bypassing fuel away from the metering valve. The control speed line 320 is also placed in fluid communication with bypass line 130 through recess 322 of valve element 304.

Figure 8:
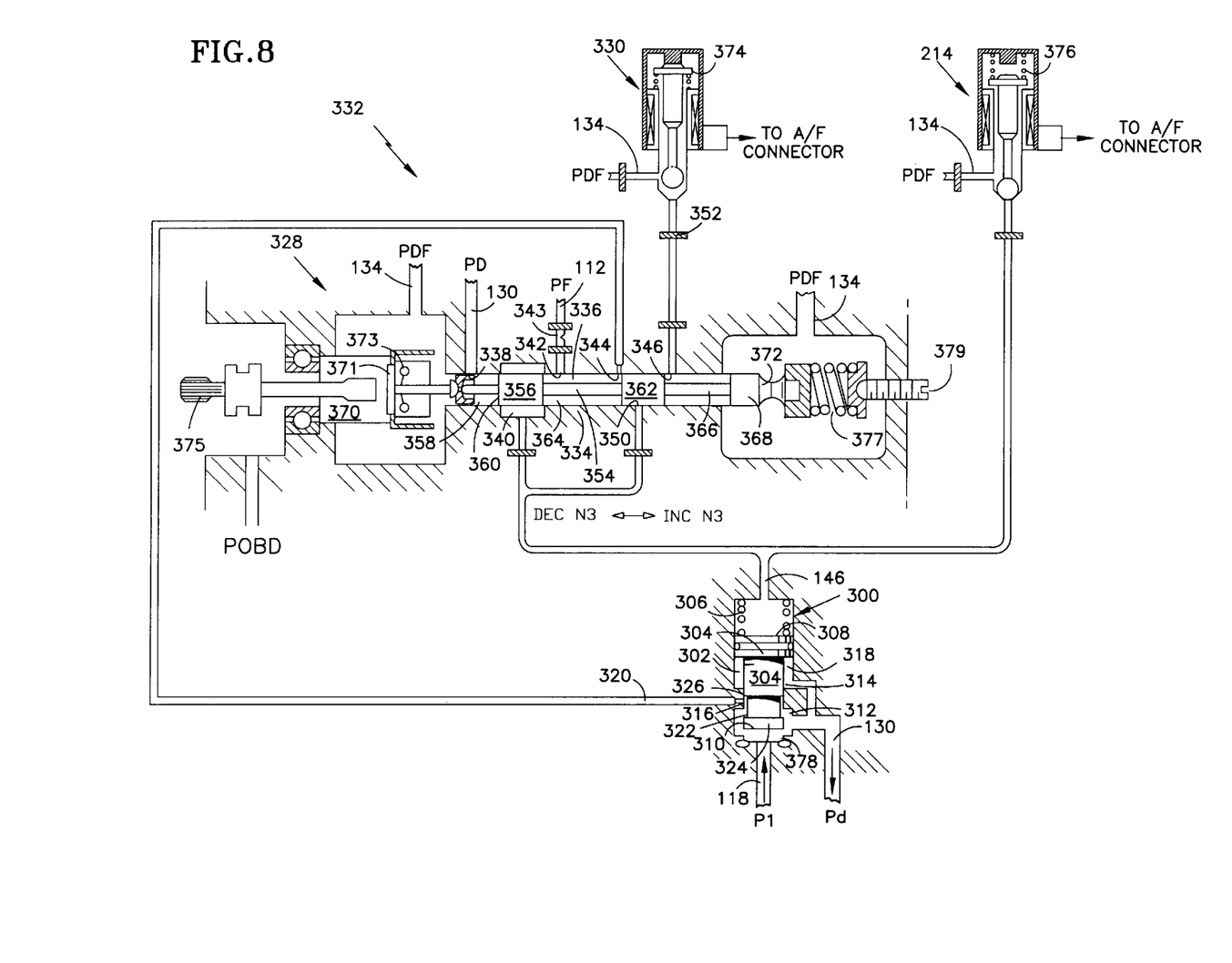
FIG. 8 is a schematic view of a start, shutoff, overspeed governor system according to a second embodiment of the present invention controlling after overspeed.

The bypassing of fuel away from the metering valve 120 reduces the speed of the engine. The reduction in engine speed causes that pivotably mounted weights 373 to reposition the spool 354, as shown in FIG. 8. Note that the overspeed governor 328 is controlling to a lower control speed (spool 354 is further to the left) than the trip speed necessary to cause the overspeed shutoff and spill valve 300 to bypass fuel from metering valve 120.

In this position first land 356 isolates the bias pressure line 146 from PD on line 130 and second land 362 isolates bias pressure line 146 from the start solenoid line 352. Second recess 364 places the control speed line 320 in fluid communication with PF in line 112 through orifice 343 and in fluid communication with bias pressure line 146. Line 320 is connected to third port 316 which is then connected to recess 322 which is connected to drain pressure on line 130. Therefore the pressure on first end 308 of valve element 304 remains less than the pressure exerted by P1 on the second end 310, thus valve element 304 remains unseated from housing 378 allowing fuel to bypass to the inlet of positive displacement pump 106.

The engine will continue to slow causing the pivotably mounted weights 373 to move the spool 354 to the left thereby causing second land 362 to block fourth port 344. This causes the pressure in bias pressure line 146 to increase since the path to drain through line 112 is partially blocked. As pressure in bias pressure line 146 increases the spill valve 324 starts to move to close off the bypass flow from main fuel line 118 to bypass line 130. This then causes the engine to stop decelerating. This process will continue until an equilibrium is reached where the flow to the engine is sufficient to maintain the second overspeed governor set point.

Figure 9:
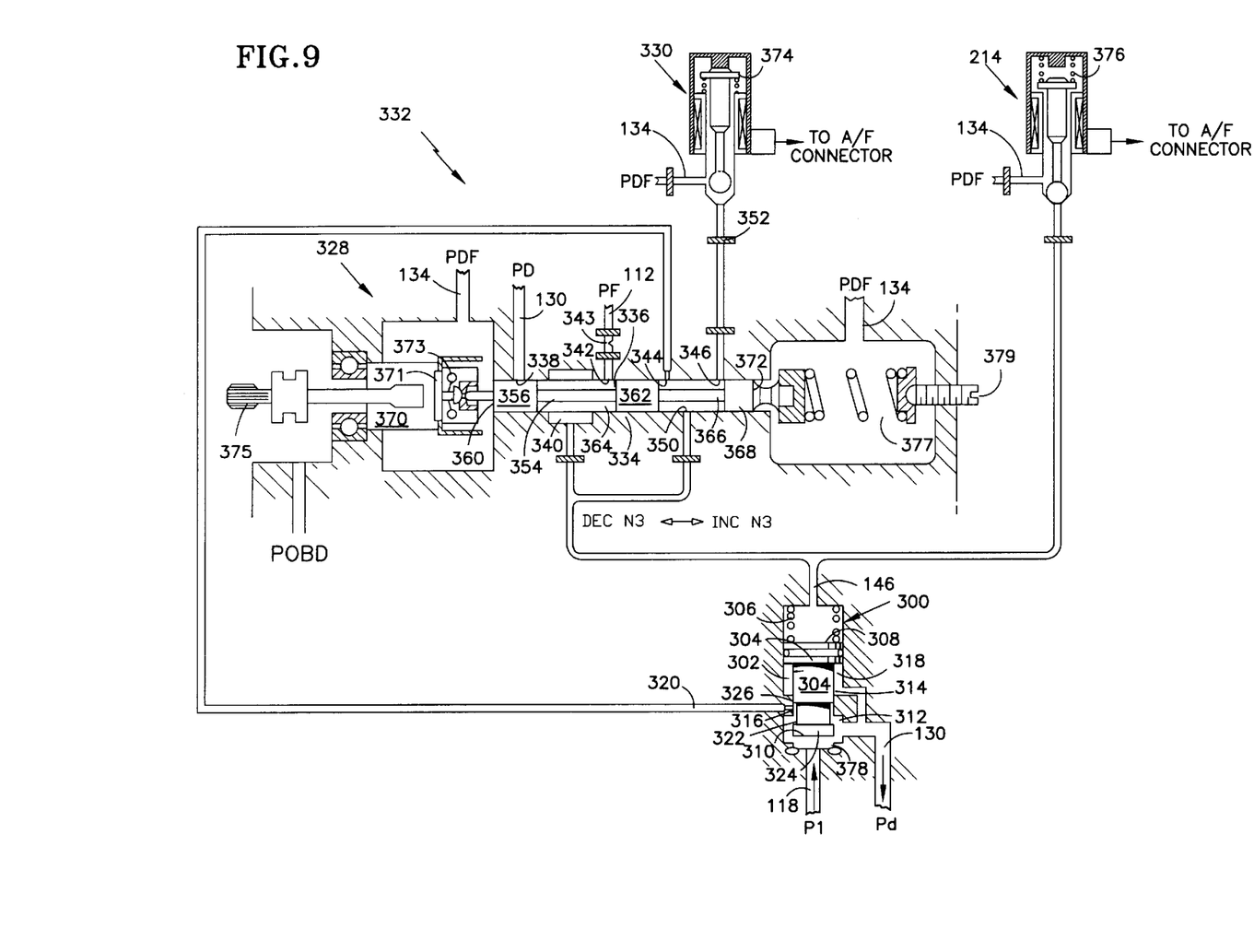
FIG. 9 is a schematic view of a start, shutoff, overspeed governor system according to a second embodiment of the present invention in failure mode.

FIG. 9 illustrates the start, shutoff and overspeed system 332 in a startup failure condition. Operation of the start, shutoff overspeed system 332 is the same as in normal operation as described above. Pivotably mounted weights 373 position spool 354 in response to engine speed. Upon system start the spool 354 is in a first position as shown in FIG. 9.

With the spool 354 in a first position first land 356 isolates PD on line 130 from bias pressure line 146. Second recess 364 places PF on line 112 in fluid communication with bias pressure line 146 while third recess 366 places bias pressure line 146 in fluid communication with the start solenoid line 352. Second land 362 isolates control speed line 320 from bias pressure line 146, while third land 368 isolates bias pressure line 146 from PD on line 130. Therefore the pressure in bias pressure line 146 is determined by the start solenoid line 352 and pressure PF on line 112.

During engine start the start solenoid valve 330 is energized such that the start solenoid line 352 is isolated from PDF on line 134 as illustrated in FIG. 5. The shutoff solenoid valve 214 is de-energized such that bias pressure line 146 is isolated from PDF on line 134.

However, during an overspeed governor 328 malfunction, as the speed of the engine increases the spool 354 fails to transition to the run position illustrated in FIG. 6 and remains in the start position as shown in FIG. 9. The start solenoid 330 is de-energized by the EEC and the start solenoid line 358 is fluidly connected to PDF on line 134 thus placing the bias pressure line 146 is fluid communication with PDF on line 134 via the overspeed governor 328. Therefore, PDF is acting on the first end 308 of valve element 304 and P1 is acting on second end 310 of valve element 304 thus unseating valve element 304 from housing 378 and allowing fuel to bypass the fuel metering valve 120, thus preventing engine start.

Operation of shutoff valve 160 for system shut down is the same for the second embodiment as for the first embodiment.

It should be understood by those skilled in the art that obvious structural modifications can be made without departing from the spirit of the invention. Accordingly, reference should be made primarily to the accompanying claims, rather than the foregoing specification, to determine the scope of the invention.

Thus having described the invention what is claimed is:

1. An overspeed protection apparatus for a fuel delivery system for providing a flow of fuel to an engine, comprising:

shutoff means for permitting the flow of fuel to the engine when the flow of fuel has a fuel pressure less than or equal to a bias pressure and for reducing the flow of fuel to the engine when said fuel pressure is greater than said bias pressure;

an overspeed protection means for setting said bias pressure for said shutoff means based on an engine speed, wherein said overspeed protection means is responsive to a threshold input pressure wherein said overspeed protection means comprises:

an engine start position for a first engine speed at which said bias pressure is set to said threshold input pressure;

an engine operating position for a second engine speed at which said bias pressure is set to a high pressure; and an engine overspeed position for a third engine speed at which a said bias pressure is set to a low pressure, wherein at said engine start position and said engine operating position said fuel pressure is less than or equal to said bias pressure and the flow of fuel is permitted and at said overspeed position said fuel pressure is greater than said bias pressure and the flow of fuel is reduced; and a control means for initially setting said threshold input pressure provided to said overspeed means to said high pressure for said first engine speed and setting said threshold input pressure to said low pressure for said second engine speed, such that if said overspeed protection means fails to move from said engine start position to said engine operating position for said second engine speed, said bias pressure is set to said low pressure such that said shutoff means reduces the flow of fuel to the engine.

2. The overspeed protection apparatus of claim 1 wherein said overspeed protection further comprises an overspeed control position for setting said engine speed to a predetermined speed after said third engine speed has been sensed.

3. The overspeed protection apparatus of claim 2 wherein said predetermined speed is equal to said third engine speed.

4. The overspeed protection apparatus of claim 2 wherein said predetermined speed is less than said third engine speed.

5. The overspeed protection apparatus of claim 1 further comprising a shutdown means for setting said bias pressure to said low pressure such that said shutoff means prevents the flow of fuel to the engine wherein said shutdown means is activated.

6. The overspeed protection apparatus of claim 5 wherein said shutdown means is activated independent of engine speed.

7. The overspeed protection apparatus of claim 1 wherein said overspeed protection means comprises a spool valve positioned by a flyweight.

8. An overspeed protection apparatus for a fuel delivery system for providing a flow of fuel to an engine, comprising:

an overspeed protection means for setting a bias pressure based on an engine speed, wherein said overspeed protection means is responsive to a threshold input pressure wherein said overspeed protection means comprises:

an engine start position for a first engine speed at which said bias pressure is set to said threshold input pressure;

an engine operating position for a second engine speed at which said bias pressure is set to a high pressure; and an engine overspeed position for a third engine speed at which a said bias pressure is set to a low pressure, wherein at said engine start position and said engine operating position said fuel pressure is less than or equal to said bias pressure and the flow of fuel is permitted and at said overspeed position said fuel pressure is greater than said bias pressure and the flow of fuel is reduced;

a control means for initially setting said threshold input pressure provided to said overspeed means to said high pressure for said first engine speed and setting said threshold input pressure to said low pressure for said second engine speed, such that if said overspeed protection means fails to move from said engine start position to said engine operating position for said second engine speed, said bias pressure is set to said low pressure;

a shutdown means for setting said bias pressure to said low pressure when said shutdown means is activated; and a shutoff means for permitting the flow of fuel to the engine when the flow of fuel has a fuel pressure less than or equal to a bias pressure and for reducing the flow of fuel to the engine when said fuel pressure is greater than said bias pressure is set by said overspeed protection means and for preventing the flow of fuel to the engine when said fuel pressure is greater than said bias pressure.

* * * * *